United States Patent [19]

Abe et al.

[11] Patent Number: 5,706,183
[45] Date of Patent: *Jan. 6, 1998

[54] INVERTER POWER SUPPLY WITH SINGLE DISCHARGE PATH

[75] Inventors: Hideaki Abe, Neyagawa; Shosuke Akisada, Shijonawate; Takio Maekawa, Hikone; Hideki Tamura, Moriyama; Satoru Inakagata, Hirakata, all of Japan

[73] Assignee: Matsushita Electric Works, Ltd., Kadoma, Japan

[*] Notice: The term of this patent shall not extend beyond the expiration date of Pat. No. 5,333,104.

[21] Appl. No.: 494,792

[22] Filed: Jun. 26, 1995

[30] Foreign Application Priority Data

Jun. 27, 1994 [JP] Japan .................... 6-144639

[51] Int. Cl.⁶ .................. H02M 3/335; H02M 3/24; H02M 7/537
[52] U.S. Cl. .................. 363/18; 363/97; 363/131
[58] Field of Search .................. 363/18, 19, 22, 363/131, 97; 331/108 C, 112

[56] References Cited

U.S. PATENT DOCUMENTS

| | | | |
|---|---|---|---|
| 4,710,695 | 12/1987 | Yamada et al. | 320/21 |
| 4,758,937 | 7/1988 | Usui et al. | 323/19 |
| 4,763,235 | 8/1988 | Morita | 363/19 |
| 4,763,236 | 8/1988 | Usui | 363/19 |
| 4,785,387 | 11/1988 | Lee et al. | 363/21 |
| 4,992,702 | 2/1991 | Shimizu et al. | 315/219 |
| 5,225,972 | 7/1993 | Sakamoto | 363/18 |
| 5,239,453 | 8/1993 | Remson | 363/19 |
| 5,333,104 | 7/1994 | Tamura et al. | 363/19 |
| 5,412,555 | 5/1995 | Uramoto | 363/18 |

FOREIGN PATENT DOCUMENTS

| | | |
|---|---|---|
| 0086521 | 8/1983 | European Pat. Off. |
| 0477596 | 4/1992 | European Pat. Off. |
| 4316945 | 12/1993 | Germany |

*Primary Examiner*—Peter S. Wong
*Assistant Examiner*—Bao Q. Vu
*Attorney, Agent, or Firm*—Armstrong, Westerman, Hattori, McLeland & Naughton

[57] ABSTRACT

An inverter power supply having a DC source, a transformer having a primary winding, a secondary winding, and a feedback winding, an L-C resonant circuit of a capacitor and the primary winding, and a self-excited oscillator. The oscillator includes an L-C resonant circuit and an FET connected in series with the primary winding across the DC source to generate a high frequency voltage across the primary winding, a feedback voltage across the feedback winding and a resulting output AC voltage across the secondary winding. A biasing capacitor is connected in parallel with a series combination of the L-C resonant circuit and the FET across the DC source to be charged thereby. The biasing capacitor is also connected in series with the feedback winding to provide an offset voltage which is additive to the feedback winding to give a bias voltage applied to a gate of the FET so as to alternately turn on and off the FET for driving the self-excited oscillator. A current sensor is provided to sense a current flowing through FET and gives a first level signal indicative of the sensed current being fed to the resonant circuit. Extending across the biasing capacitor is a single discharge path which does not go through the FET. A switching transistor is inserted in the single discharge path and is caused to turn on, upon the first level signal exceeding a threshold level, to discharge the biasing capacitor to a level for maintaining the offset voltage at a constant level during continued oscillation of the L-C resonant circuit.

10 Claims, 18 Drawing Sheets

LOAD CONNECTED

INVERTER POWER SUPPLY WITH SINGLE DISCHARGE PATH

BACKGROUND OF THE INVENTION

1. Field of the Invention

The present invention is directed to an inverter power supply providing an output AC power through a coupling transformer for driving a device, and more particularly to an inverter power supply including a self-excited oscillator for energizing and/or charging compact electrical appliances such a audio-video appliances, portable telephone, electric toothbrush, dry shaver, power tools and electrical appliance for outdoor use for automobiles.

2. Description of the Related Prior Art

A prior art inverter power supply is disclosed in U.S. Pat. No. 5,333,104. As shown in FIG. 1, the prior power supply comprises a DC voltage source 10' providing a DC voltage, a transformer 20' having a primary winding 21', a secondary winding 22', and a feedback winding 23', an L-C resonant circuit formed by the primary winding 21' and a capacitor 25', and a self-excited oscillator energized by the DC voltage to generate a high frequency voltage across the primary winding 21' and induce across the secondary winding 22' a resulting output AC voltage for driving a load 50'. The oscillator comprises an FET transistor 30' which is connected in series with the primary winding 21' across the DC voltage and is driven to turn on and off by the high frequency voltage induced across the feedback winding 23'. A biasing capacitor 12' is connected in the circuit to be charged by the DC voltage source 10' to give an offset voltage $V_{OFF}$. The biasing capacitor 12' is also connected in series with the feedback winding 23' across a source-gate path of FET 30' so that the offset voltage $V_{OFF}$ is additive to the feedback voltage at the feedback winding 23' to give a bias voltage $V_G$ applied to a gate of FET 30' for alternately turning on and off FET to thereby effect a self-excited oscillation of providing the high frequency voltage across the primary winding 21'.

In order to prevent FET 30' from being turned on for an extended period in response to an increase in the input DC voltage, a bias stabilizing circuit is introduced in this prior art power supply. The bias stabilizing circuit comprises a resistor 15' and a bypass diode 16' connected so as to lower the offset voltage by discharging the biasing capacitor 12' through FET 30' being turned on, so as to correspondingly lower the bias voltage applied to the gate of FET 30', thus enabling FET 30' to turn on only for substantially a constant ON-time period irrespective of an increase in the input DC voltage. In other words, since the increased input DC voltage will increase the high frequency feedback voltage, the resulting bias voltage has an elongated time period in which the bias voltage exceeds a threshold voltage of FET 30', which, in the absence of the above bias stabilizing circuit, would act to extend the ON-period of FET 30' with corresponding increase in a current flowing through FET 30' and therefore bring an undesired switching loss. In this sense, the prior art power supply is found satisfactory in minimizing a switching loss and operating efficiently.

However, a problem still exists in this prior power supply in that the bias stabilizing circuit may be over-active to discharge the biasing capacitor 12' upon the initial power-up of the circuit or upon the drain voltage of FET 30' decreasing considerably, whereby the offset voltage $V_{OFF}$ is lowered to such an extent that FET 30' fails to be made conductive even when the feedback voltage subsequently increases to otherwise turn on the FET. For example, at the initial power-up of the circuit, FET 30' is initially made conductive after the biasing capacitor 12' is charged to give the offset voltage alone exceeding a threshold gate voltage of FET 30'. At this instant, the feedback voltage developed across the feedback winding 23' begins to increase to correspondingly increase the bias voltage applied to the gate of the FET, while the bias stabilizing circuit of resistor 15' and diode 16' acts to discharge the biasing capacitor 12' to lower the offset voltage. Thus, the bias voltage remains above the threshold voltage of the FET to keep the FET conductive over an extended period, as compared to the stable oscillation in which the FET is caused to turn on by the bias voltage which is the sum of the offset voltage and the feedback voltage. Accordingly, the biasing capacitor 12' is discharged to lower the offset voltage $V_{OFF}$ to such an extent that the subsequently available feedback voltage plus the lowered offset voltage is insufficient to turn on the FET, resulting in interrupted or unstable oscillation. Likewise, when the input DC voltage varies greatly to correspondingly vary the oscillation voltage, the drain voltage of the FET may be lowered to a large extent than the voltage of biasing capacitor 12'. Upon this occurrence, the biasing capacitor is over-discharged to lower the offset voltage to such an extent as to fail to subsequently turn on the FET. Therefore, the prior art power supply with the bias stabilizing circuit which discharges the biasing capacitor through the FET suffers from the above problem of causing over-discharging which results in unstable oscillation.

SUMMARY OF THE INVENTION

The above problem has been eliminated in an inverter power supply of the present invention which comprises a DC voltage source providing a DC voltage, a transformer having a primary winding, a secondary winding, and a feedback winding, an L-C resonant circuit of a capacitor and the primary winding, and a self-excited oscillator. The oscillator comprises the L-C resonant circuit and a switching element which is connected in series with the primary winding across the DC supply and is alternately turned on and off to generate a high frequency voltage across the primary winding, a high frequency feedback voltage across the feedback winding and a resulting output AC voltage across the secondary winding. The output AC voltage is applied to a load circuit of the device. A biasing capacitor is connected with a series combination of the L-C resonant circuit and the switching element across the DC voltage source to be charged by a current from the DC voltage. The biasing capacitor is also connected in series with the feedback winding to provide an offset voltage which is additive to the high frequency feedback voltage developed across the feedback winding to give a bias voltage applied to a control terminal of the switching element so as to alternately turn on and off the switching element for driving the self-excited oscillator. A current sensor is provided to sense a current flowing through the switching element and to give a first level signal indicative of the sensed current being fed to the resonant circuit. Extending across the biasing capacitor is a single discharge path which does not go through the switching element. A switching means is inserted in the single discharge path and is caused to turn on, upon the first level signal exceeding a threshold level, to discharge the biasing capacitor to a level for maintaining the offset voltage at a constant level during continued oscillation of the L-C resonant circuit. The switching means acts to turn off the switching element upon the current being fed to the resonant circuit reaches a predetermined level to effect a feedback control of limiting the current to a constant level responsible for the stable oscillation. As soon as the switching element is turned off, the switching means responds to turn off to shut the discharge path so that the biasing capacitor is discharged only for a short time period but sufficient for maintaining the offset voltage or the bias voltage at a constant level, thereby preventing over-discharging of the biasing capacitor and therefore maintaining a stable oscillation.

Accordingly, it is a primary object of the present invention to provide an inverter power supply which is capable of keeping a stable oscillation irrespective of possible variations in the input DC voltage and the output voltage.

In a preferred embodiment, the power supply includes an input voltage monitor which provides a second level signal indicative of the input DC voltage supplied from the DC voltage source. The input voltage monitor is connected in so as to add the second level signal to the first level signal such that the switching means is caused to turn on when the sum of the first and second level exceeds the threshold level. With this circuit arrangement, the switching means turns on to discharge the biasing capacitor in response to a smaller current flowing through the switching element as the input DC voltage becomes high, and vice versa. Thus, the switching means acts to regulate the current flowing through the switching element depending upon the varying level of the DC voltage, thereby keeping the output voltage at a constant level irrespective of varying input DC voltage, which is therefore another object of the present invention.

Further, the power supply may include an output voltage monitor which provides a third level signal indicative of an output voltage from the primary winding. The output voltage monitor is connected in so as to add the third level signal to the first level signal such that the switching mean is caused to turn on when the sum of the first and third level exceeds the threshold level. In this manner, the current supplied to the L-C resonant circuit is controlled in a feedback manner to keep the output voltage at a constant level, even when the output voltage would be otherwise caused to fluctuate due to varying load requirement, which is therefore a further object of the present invention.

These and still other objects and advantageous features will become more apparent from the following description of the embodiments when taken in conjunction with the attached drawings.

DETAILED DESCRIPTION OF THE EMBODIMENTS

Figure 1:
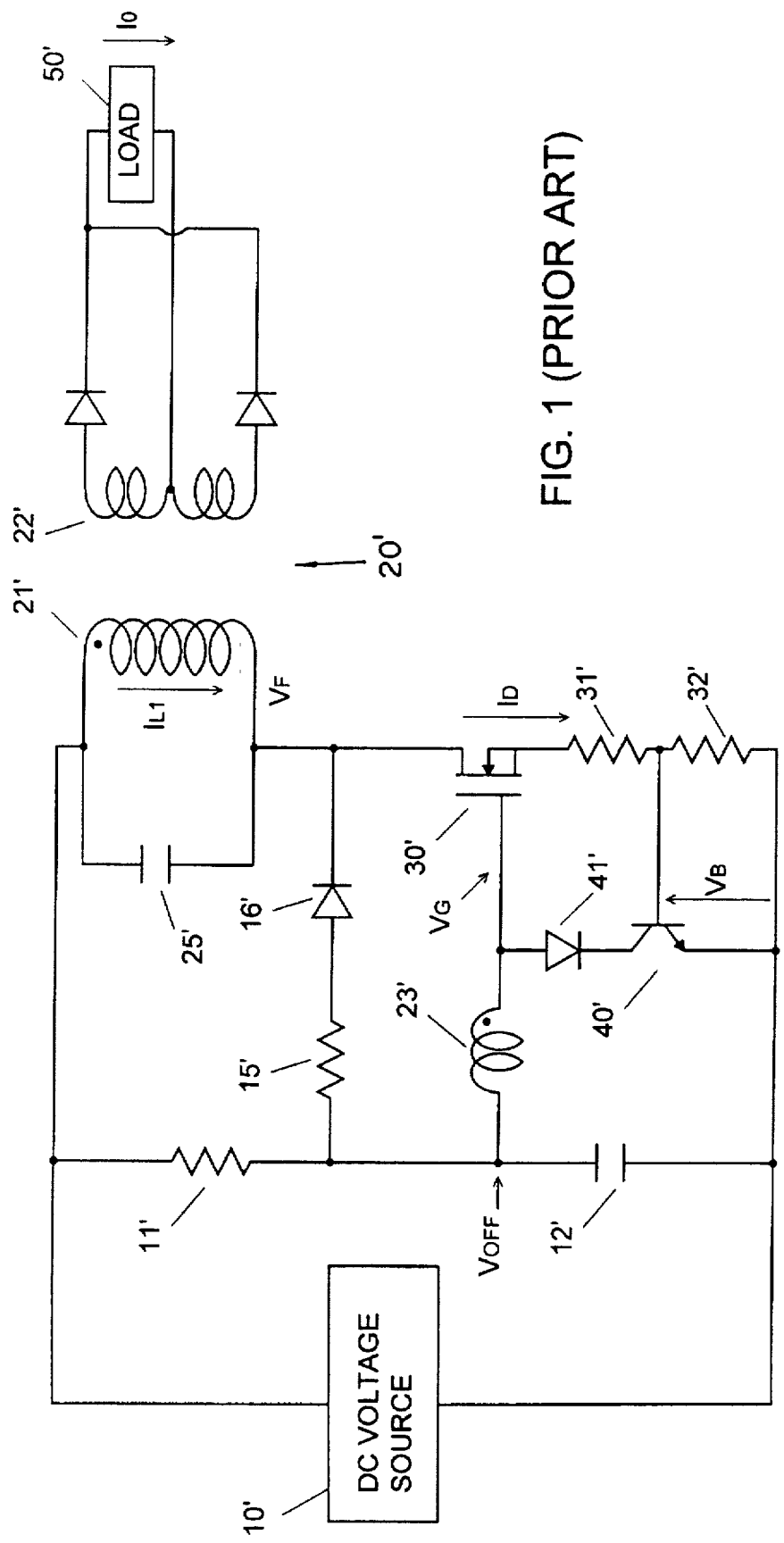
FIG. 1 is a circuit diagram illustrating an inverter power supply of the prior art.
Figure 2:
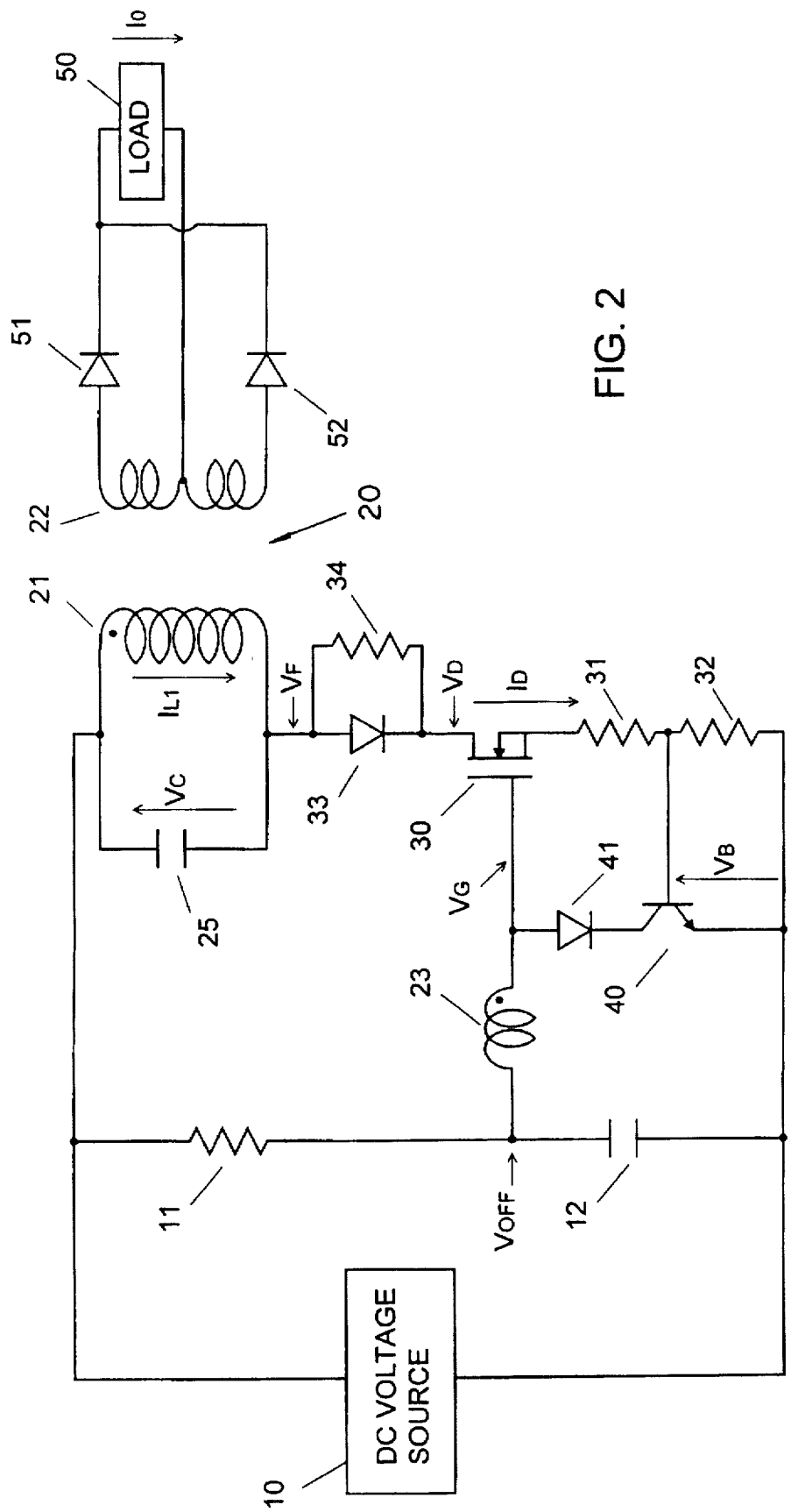
FIG. 2 is a circuit diagram of an inverter power supply in accordance with a first embodiment of the present invention.
Figure 3:
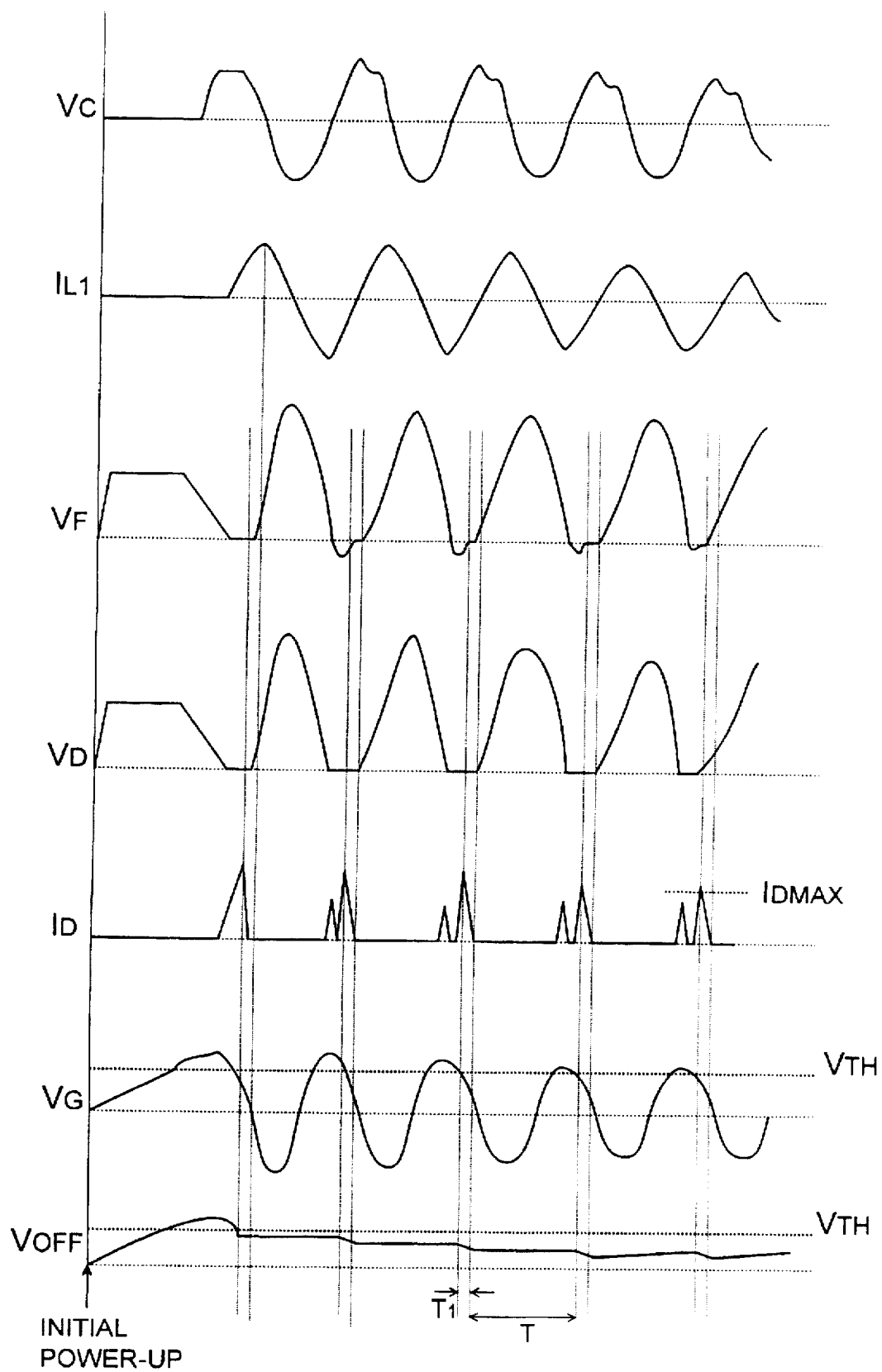
FIG. 3 is a waveform chart explaining the operation of the power supply of FIG. 2.

First Embodiment <FIGS. 2 and 3>

Referring now to FIG. 2, there is shown an inverter power supply in accordance with a first embodiment of the present invention. The power supply comprises a DC supply 10 providing a DC voltage and a self-excited oscillator which includes a transformer 20 for convening the DC voltage from the DC supply 10 into a high frequency AC voltage to be applied to a load 50 for energization thereof. The transformer 20 has a primary winding 21, a secondary winding 22, and a feedback winding 23. The primary winding 21 is connected in parallel with a capacitor 25 to form a parallel L-C resonant circuit which is connected in series with an FET transistor 30 across the DC source 10 to constitute the self-excited oscillator. The secondary winding 22 is connected through a rectifier circuit of diodes 51 and 52 to energize the load 50, for example, a rechargeable battery. Also included in the power supply are a series circuit of a starting resistor 11 and a biasing capacitor 12 connected across the DC supply 10. The feedback winding 23 has a first end connected to a gate of FET 30 and has a second end connected to a point between the resistor 11 and the biasing capacitor 12. At the start of circuit operation, the biasing capacitor 12 is charged by the DC voltage to give a bias voltage so as to firstly turn on FET 30, as will be discussed later. After the power supply goes into a stable operation mode of providing a high frequency resonant voltage across the primary winding 21, the biasing capacitor 12 acts to give an offset voltage $V_{OFF}$ which is added to a high frequency feedback voltage induced across the feedback winding 23 to provide a bias voltage $V_G$ applied to the gate of FET 30 for alternately turning on and off FET 30.

Further included in the power supply is a bipolar transistor 40 connected between a source-gate path of FET 30 with a collector of transistor 40 connected through a diode 41 to a point between the feedback winding 23 and the gate of FET 30 and with a base connected to a point between resistors 31 and 32 which are connected in series between the source of FET 30 and the ground. A parallel circuit of diode 33 and resistor 34 is inserted between the L-C resonant circuit and the drain of FET 30. The resistor 32 acts as a current sensing sensor so as to apply to transistor 40 a bias voltage $V_B$ which is proportional to the current In flowing through FET 30, i.e., being fed to the L-C resonant circuit.

Operation of the inverter power supply will be now discussed with reference to FIG. 3. Upon initial power-up of the circuit, the DC voltage source 10 provides the DC voltage across the series circuit of the starting resistor 11 and the biasing capacitor 12 so as to charge the biasing capacitor 12 through the resistor 11. When the biasing capacitor 12 is charged to give the offset voltage $V_{OFF}$ exceeding a threshold voltage $V_{TH}$ of FET 30, FET 30 is made conductive to start flowing a current $I_D$ firstly through capacitor 25 and then through the primary winding 21 to supply the energy to the resonant circuit. As the current $I_D$ begins to flow, the feedback winding 23 responds to induce a feedback voltage which is added to the offset voltage $V_{OFF}$ to rapidly increase the resulting bias voltage $V_G$, thereby making FET 30 fully conductive and therefore increasing the current $I_D$. When the current $I_D$ increases to such a level that the voltage across the current sensing resistor 32 exceeds a threshold of the transistor 40, transistor 40 is turned on to discharge the biasing capacitor 12 with resulting lowering of the bias voltage $V_G$, thereby making FET 30 less conductive to lower the current $I_D$. This causes the feedback winding 23 to develop a negative feedback voltage which lowers the bias voltage $V_G$ below the threshold voltage $V_{TH}$ of FET 30, thereby turning off FET 30 completely as well as transistor 40. After FET 30 is turned off to stop feeding the current $I_D$, the L-C resonant circuit of primary winding 21 and capacitor 25 starts oscillating to provide an oscillation voltage $V_C$ with a varying current $IL_1$ flowing through the primary winding 21. Due to this varying current $I_{L1}$, the feedback winding 23 induces the feedback voltage which increases the bias voltage $V_G$ again over the threshold voltage $V_{TH}$, so that FET 30 is turned on to energize the resonant circuit. Thereafter, FET 30 is turned off by the increasing current $I_D$ in the manner as described in the above. The above starting cycle is repeated until the voltage across the biasing capacitor 12 settles to substantially a constant level where an equilibrium is reached between the charge current $I_{11}$ to the biasing capacitor 12 from the DC voltage source 10 during a period T and the discharge current $I_{40}$ from the biasing capacitor 12 through transistor 40 during a period $T_1$. Thereafter, the circuit operates to continue the stable oscillation. In FIG. 3, VF and VD represent voltages at illustrated points in the circuit.

Since FET 30 is turned off immediately after the current $I_D$ reaches its maximum $I_{DMAX}$, i.e., a level at which transistor 40 is turned on, energy $P_L$ which is stored in the primary winding 23 at each time after FET 30 is turned off is represented by the following equation in view of that the current $I_D$ is nearly equal to the current flowing through the primary winding 21:

$$P_L = \frac{1}{2L_1} \cdot I_{DMAX}^2$$

wherein $L_1$ is inductance of primary winding 21.
While, the energy which is stored in the capacitor 25 each time after FET 30 is turned off is represented by the following equation:

$$P_C = \frac{1}{2C_1} \cdot E_0^1$$

wherein $C_1$ is capacitance of capacitor 25 and E0 is voltage of DC voltage source 10.
Accordingly, the energy P(=PL+PC) is given to the L-C resonant circuit to effect oscillation for transmitting the resulting energy to the load.

Since FET 30 is turned off as a result of that the current $I_D$ flowing through resistor 32 increasing to turn off transistor 40, no excess current $I_D$ is allowed to flow in the circuit even if the resonant circuit acts to produce an excessive oscillation voltage in response to possible load variation. Thus, the transistor 40 acts to limit the current $I_D$ supplied to the L-C resonant circuit in a feedback manner based upon the current $I_D$ or the oscillation voltage $V_C$, in addition to causing the L-C resonant circuit to oscillate. In this sense, the transistor 40 and the current sensing resistor 32 are deemed to constitute the oscillation circuit with the FET 30 and the L-C resonant circuit. Further, since transistor 40 is turned off after FET 30 is turned off, the biasing capacitor 12 is discharged only for a short time, thereby preventing over-discharging of the biasing capacitor 12 to keep the offset voltage $V_{OFF}$ at a constant level and therefore assuring to continue stable oscillation.

Second Embodiment <FIGS. 4 to 7>

Figure 4:
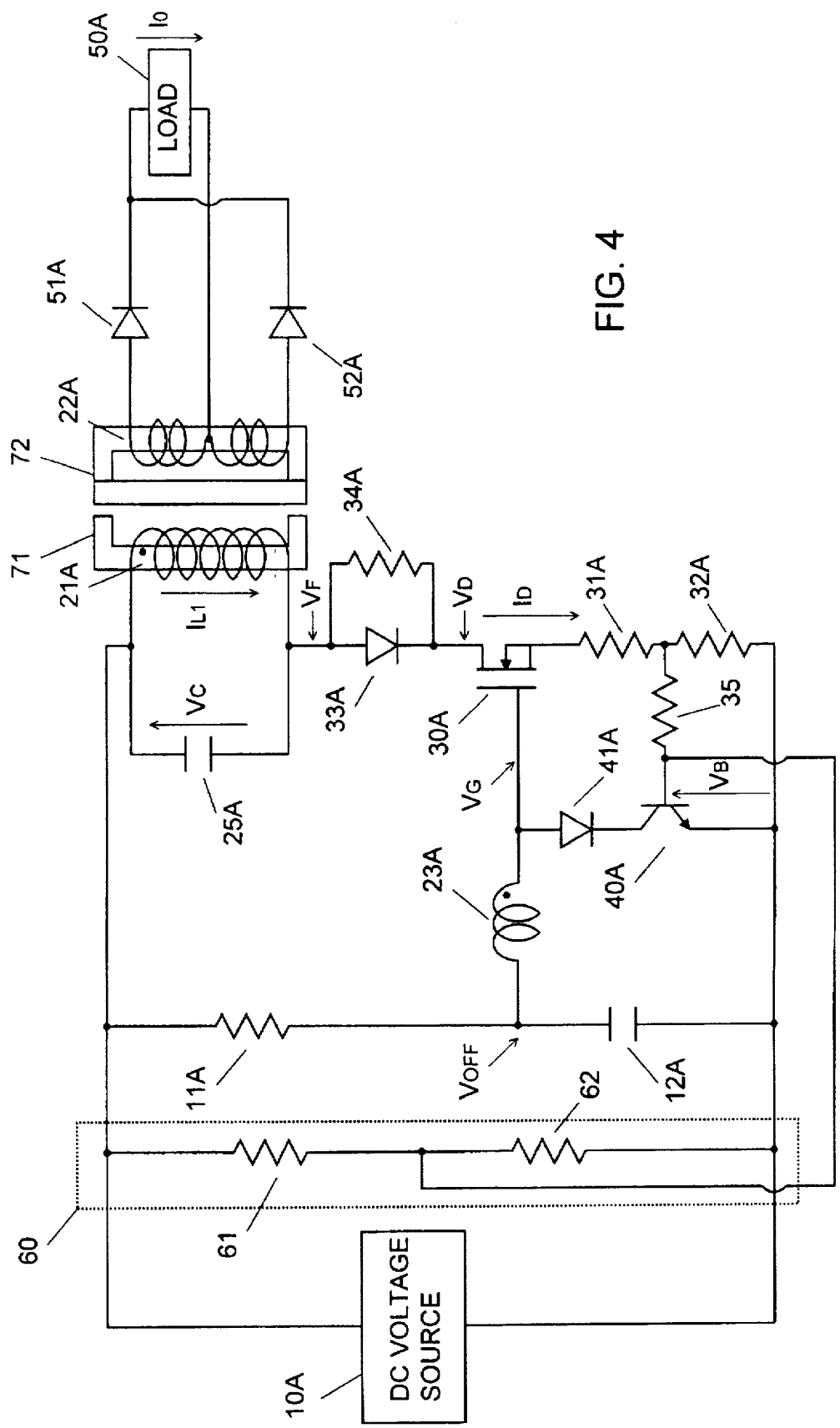
FIG. 4 is a circuit diagram of an inverter power supply in accordance with a second embodiment of the present invention.
Figure 5:
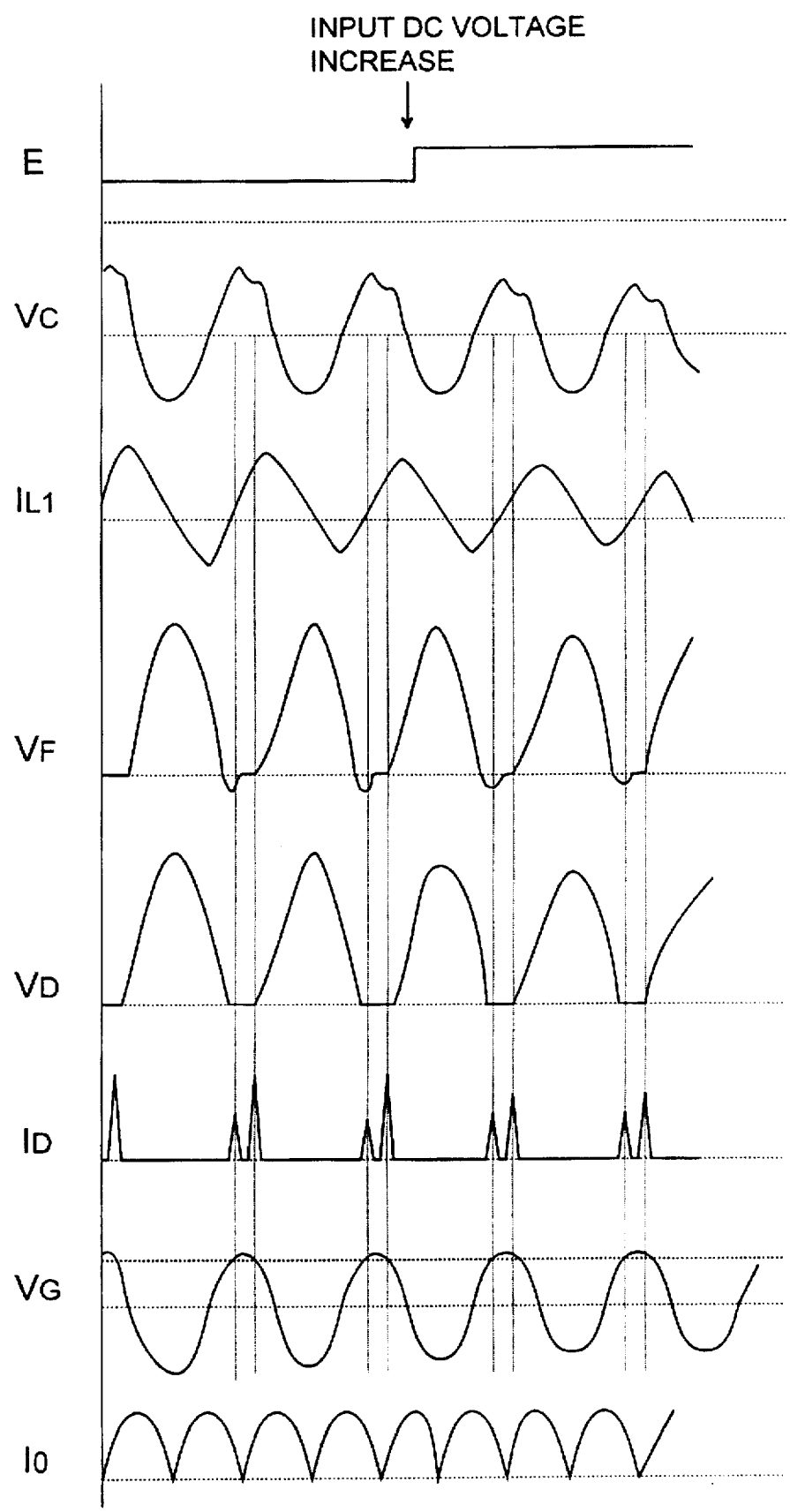
FIG. 5 is a waveform chart explaining the operation of the power supply of FIG. 4.

FIG. 4 illustrates an inverter power supply in accordance with a second embodiment of the present invention which is similar to the first embodiment except that an input voltage monitor 60 is added for effecting a feedback control of producing a constant output voltage irrespective of a wide variation in the input DC voltage. Like elements are designated by like numerals with a suffix letter of "A". The input voltage monitor 60 comprises a voltage divider of resisters 61 and 62 connected across the DC voltage source 10A, and a resistor 35 connected in series with resistor 32 across the base-emitter path of transistor 40A so as to give an input level signal which is a divided voltage of the input DC voltage. The input level signal, i.e., monitored divided voltage is applied to the base of transistor 40A in an additive relation to the voltage developed across current sensing resistor 32. Since the input level signal is proportional to the input DC voltage, transistor 40A turns on with a small current $I_D$ as the input DC voltage becomes high, and turns on with a large current $I_D$ as the input DC voltage becomes low. This means that FET 30A will turn off rapidly as the current $I_D$ increases with the increase in the input DC voltage, and FET 30A will turn off slowly as the current $I_D$ decreases with the decrease in the input DC voltage. In this manner, the circuit operates to increase energy $P_L$ when energy PC is reduced, and vice versa. Consequently, it is readily possible to maintain the output energy P (=PL+PC) and therefore the current I0 being fed to the load 50A at a constant level irrespective of the input DC voltage by suitably selecting resistance for resistors 61, 62, 32 and 35. The above operation is easily seen in FIG. 5 in which the input DC voltage E increases at an illustrated timing, after which the current $I_D$ is limited in the direction of providing a constant output oscillation voltage $V_C$ and constant output current I0. In this embodiment, the transformer 20A is shown to include a primary core 71 and a secondary core 72 around which the primary winding 21A and the secondary winding 22A are wound, respectively. The primary and secondary cores 71 and 72 are accommodated within a power supply housing and an electrical device housing, respectively, so that the energy is transmitted by electromagnetic induction from the primary winding in the power supply housing to the secondary winding in the device housing.

Figure 6:
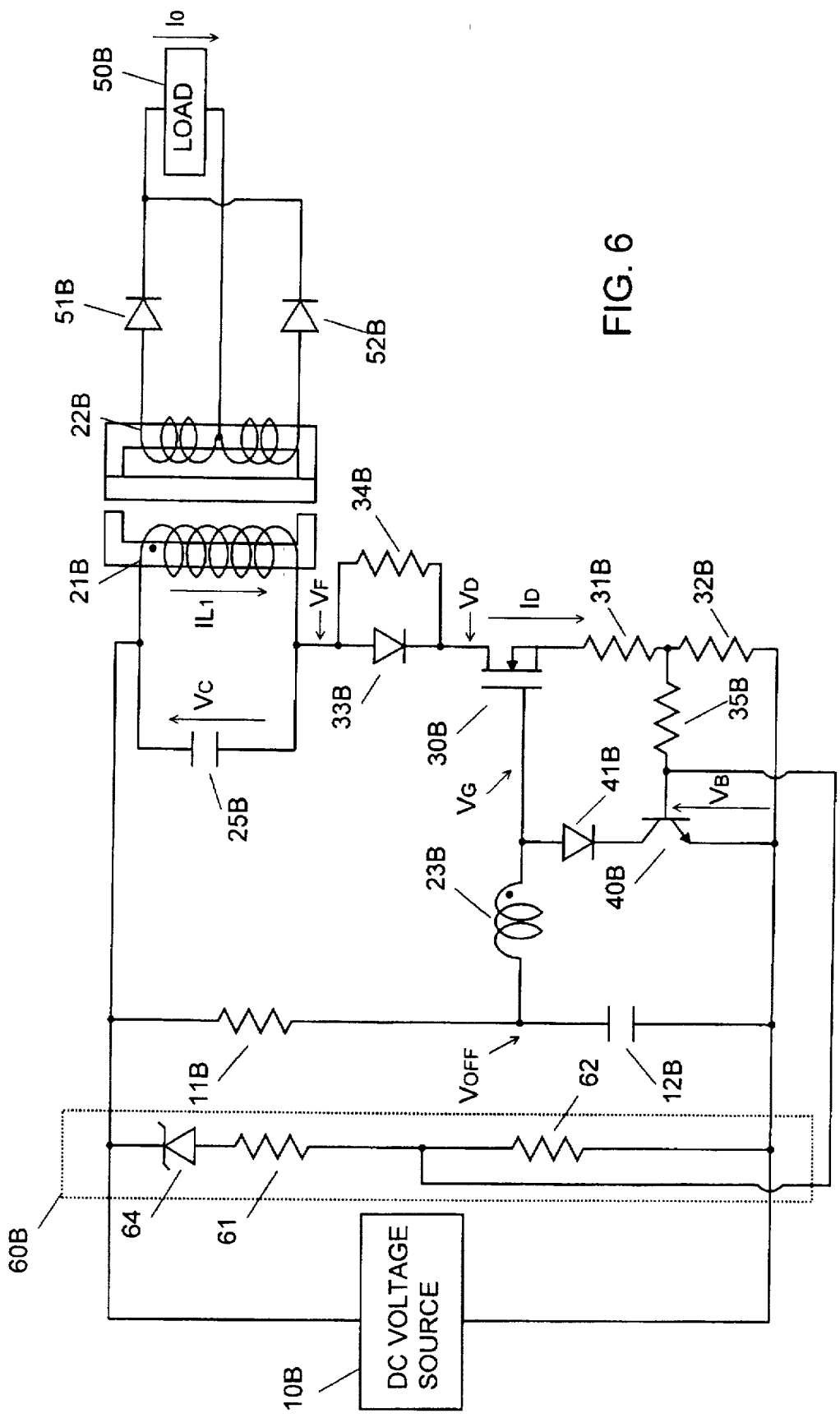
FIGS. 6 and 7 are circuit diagrams illustrating modifications of the circuit of FIG. 4, respectively.

FIG. 6 illustrates a modification of the above circuit in which a zener diode 64 is added in series with resistor 61B so that transistor 40B receives at its base a monitored voltage which is applied to the base of transistor 40B only when the input DC voltage exceeds a predetermined level. Like elements are designated by like numerals with a suffix letter of "B".

Figure 7:
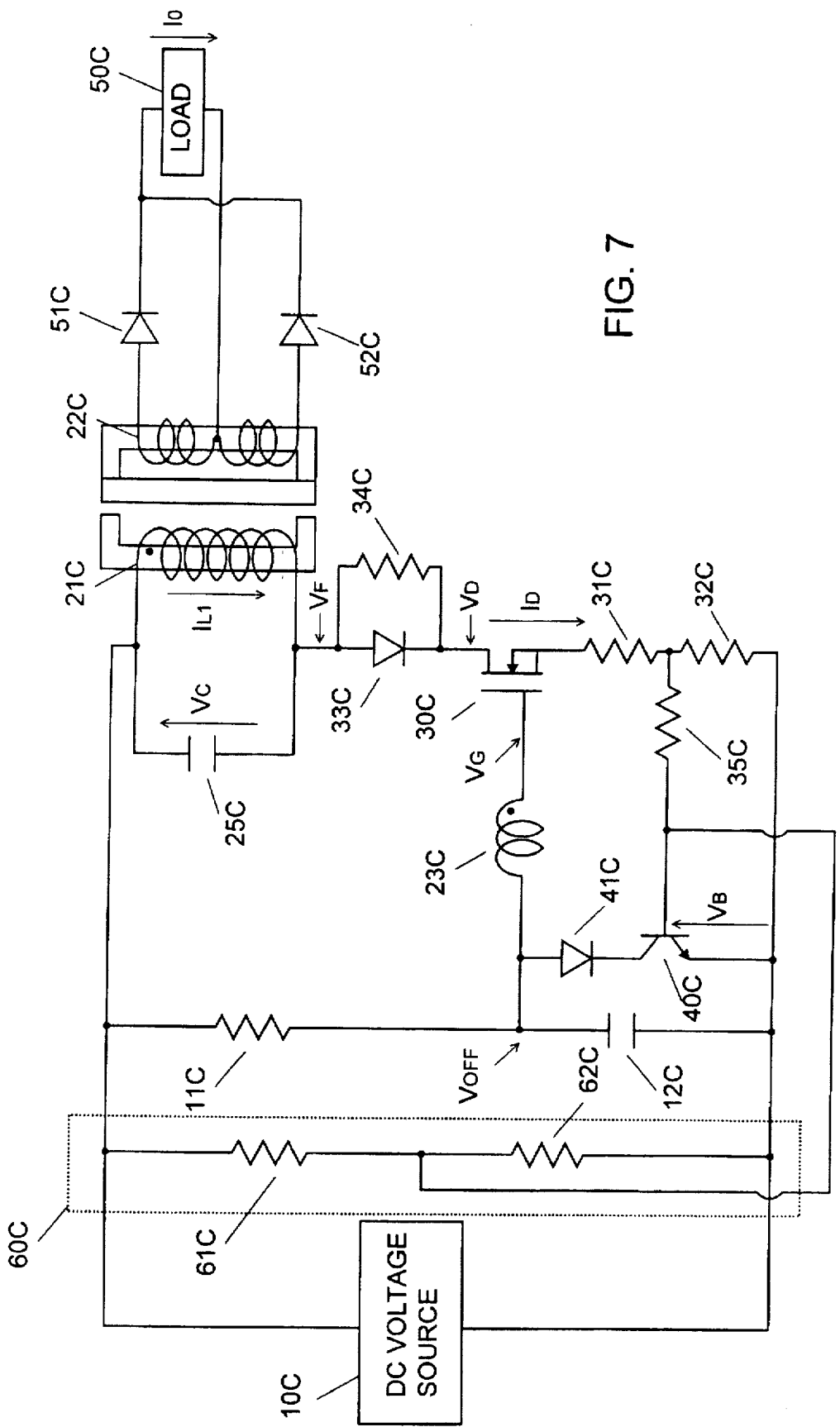

FIG. 7 illustrates another modification of the above circuit in which collector of transistor 40C is connected through diode 41C to a point between the feedback winding 23C and the biasing capacitor 12C. Operation of the circuit is identical to the above second embodiment and like elements are designated by like numerals with a suffix letter of "C".

Third Embodiment <FIGS. 8 to 15>

Figure 8:
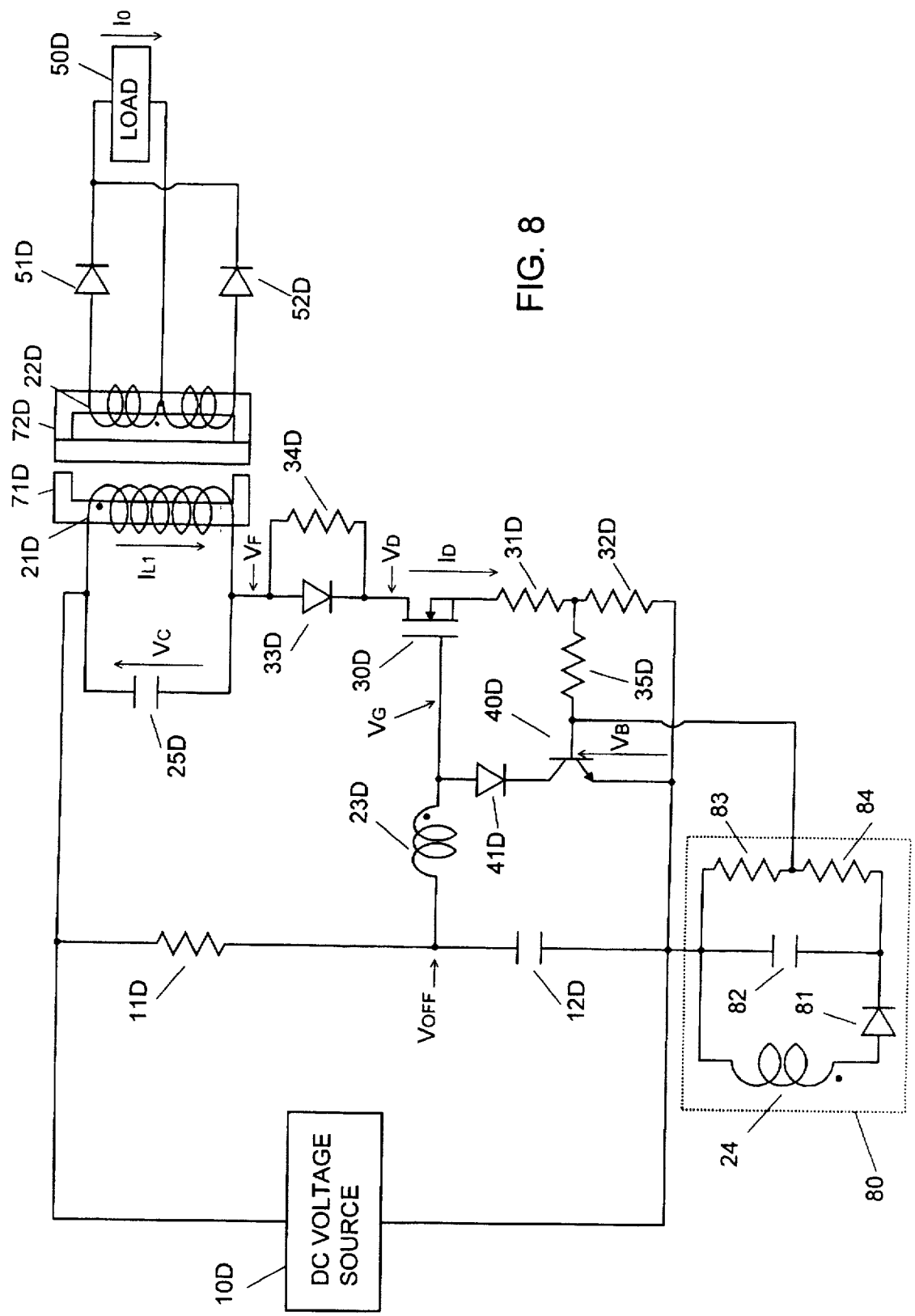
FIG. 8 is a circuit diagram of an inverter power supply in accordance with a third embodiment of the present invention.
Figure 9:
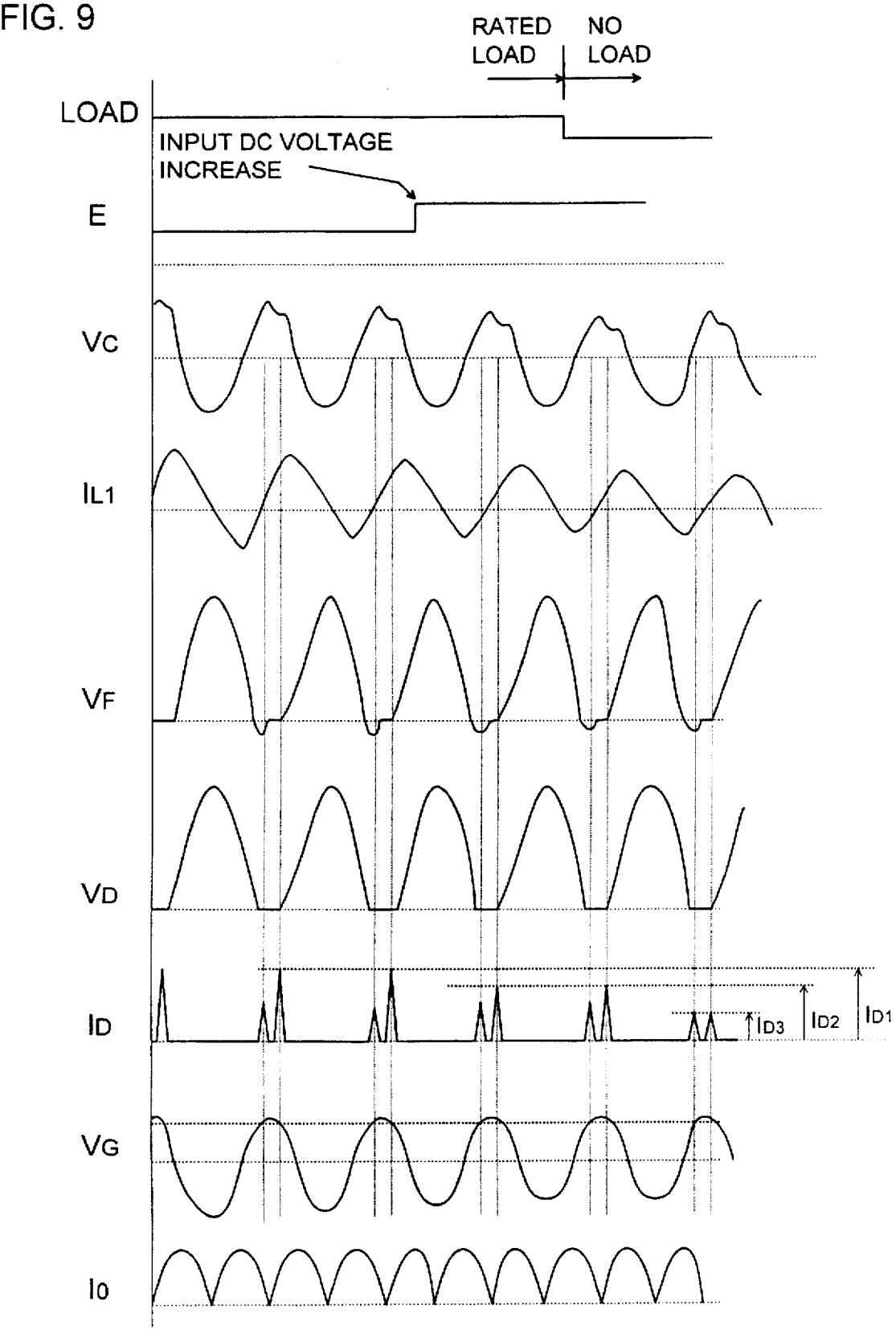
FIGS. 9 and 10 are waveform charts explaining the operation of the circuit of FIG. 8.
Figure 10:
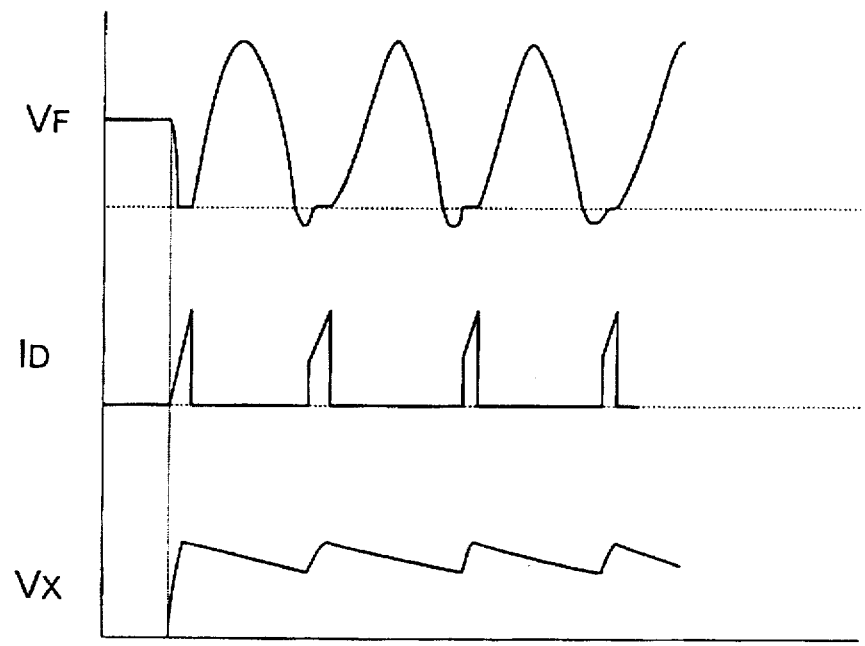
Figure 13:
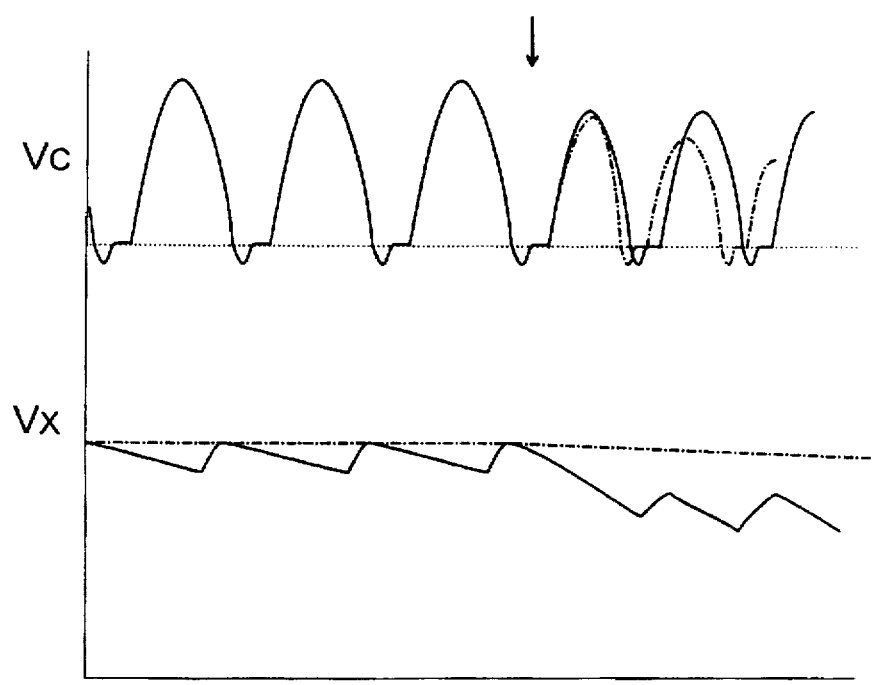
FIG. 13 is a waveform chart explaining the operation of the circuit of FIG. 12.

FIG. 8 illustrates an inverter power supply in accordance with a third embodiment of the present invention which is similar to the first embodiment except that an output voltage monitor 80 is added for effecting a feedback control of producing a constant oscillation voltage $V_C$ irrespective of variations in the input DC voltage and also in the load requirement. Like elements are designated by like numerals with a suffix letter of "D". The output voltage monitor 80 comprises an auxiliary feedback winding 24 magnetically coupled to the primary winding 21D to induce a feedback voltage as indicative of the output voltage to be fed to the secondary winding 22D. The feedback voltage induced at the auxiliary winding 24 is rectified and smoothed by a diode 81 and a capacitor 82 connected across the auxiliary feedback winding 24. A voltage divider of resistors 83 and 84 is connected across the capacitor 82 so as to give a feedback level signal which is a divided voltage of the monitored voltage indicative of the oscillation voltage $V_C$. Thus a divided voltage is applied to the base of transistor 40D in an additive relation to the voltage developed across the current sensing resistor 32D. A feedback operation is now discussed with reference to FIG. 9. When the input DC voltage increases from $E_1$ to $E_2$ to increase the oscillation voltage $V_C$, the voltage applied to the base of transistor 40D increases correspondingly so that transistor 40D will turn on at a small current $I_D$ with attendant lowering ($I_{D1}$ to $I_{D2}$) of a peak value of the current $I_D$. As the peak value of current $I_D$ decreases, the energy supplied to the primary winding 21D is lowered to thereby maintain the resulting oscillation voltage $V_C$ at a constant level. Further, when the load 50D is disconnected while the circuit is operating to change an operating condition from a rated load to a no load condition, the oscillation voltage $V_C$ increases with the reduction in the energy transmitted from the primary winding 21D to the secondary winding 22D. As the oscillation voltage $V_C$ increases, the voltage applied to the base of transistor 40D increases correspondingly so that transistor 40D will turn on at a small current $I_D$ with a further attendant lowering of a peak value ($I_{D2}$ to $I_{D3}$) of the current $I_D$. Thus, the energy supplied to the primary winding 21D is lowered to limit the increase of the oscillation voltage $V_C$, thereby keeping the oscillation voltage $V_C$ at a constant level. In this manner, the oscillation voltage $V_C$ can be kept at a constant level irrespective of variations in the input DC voltage and in the load requirement. It is noted in this connection that since the above circuit arrangement enables to keep the oscillation voltage $V_C$ at a constant level, a constant output voltage is obtained even when circuit constant will vary due to an environmental temperature change or variations in the constants of circuit components. Further, even if the resonance circuit suffers from varying inductance due to differing coupling conditions between the primary winding and the secondary winding, the oscillation voltage $V_C$ can be kept at a constant level, thereby maintaining a constant electric power to be transmitted to the load. It is noted in this connection that the winding sense of the auxiliary winding 24 is selected such that, as shown in FIG. 10, the auxiliary winding 24 gives the feedback voltage $V_X$ in response to the turning on of FET 30D. Thus, the auxiliary winding 24 acts to apply the voltage $V_X$ to the base of transistor 40D in the direction of tuning on transistor 40D immediately after FET 30D is turned on to start flowing the current $I_D$, thereby limiting the current $I_D$ to a suitable level for continuing the oscillation successfully.

Figure 11:
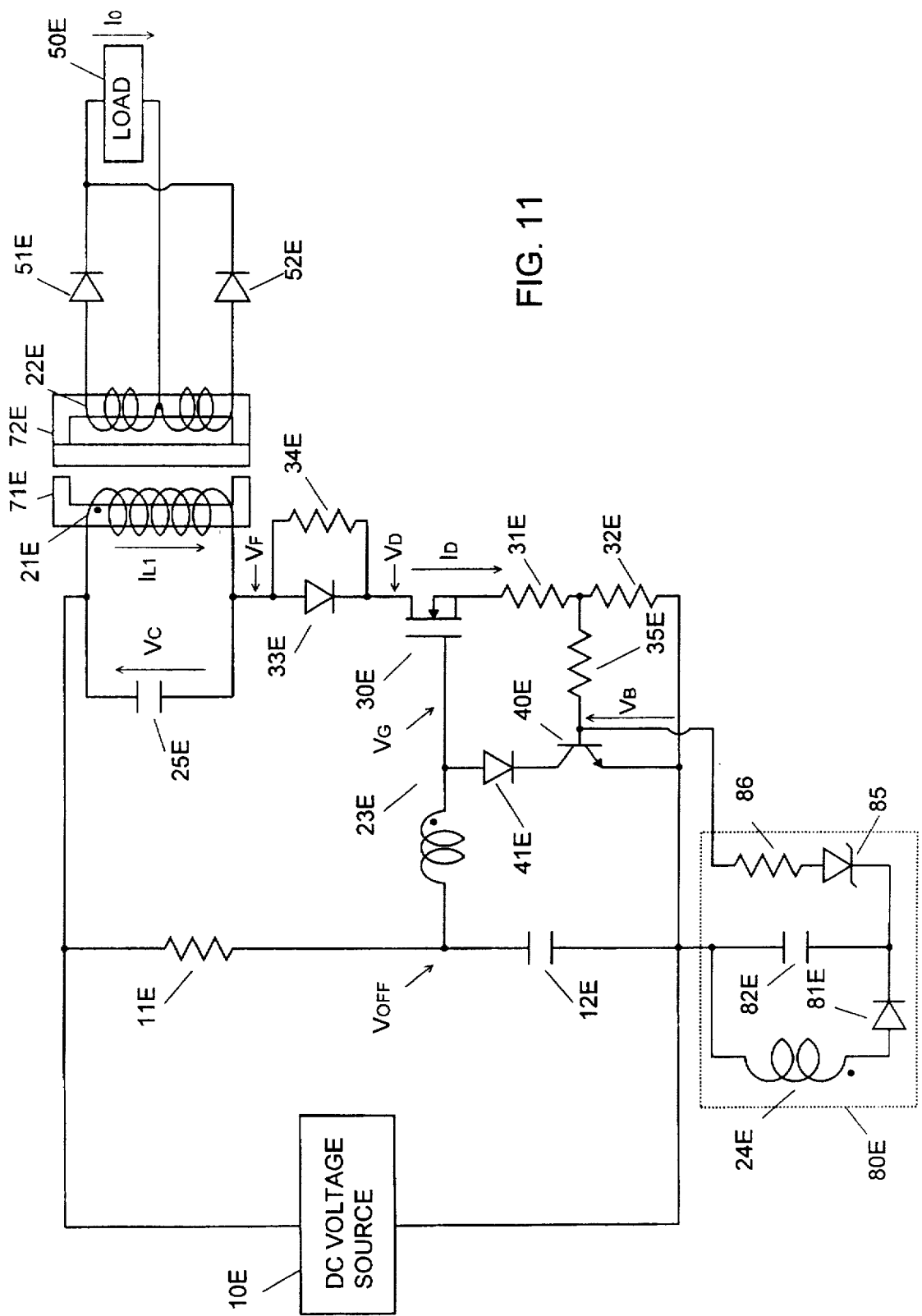
FIGS. 11 and 12 are circuit diagrams illustrating modification of the circuit of FIG. 8, respectively.

FIG. 11 illustrates a modification of the above circuit in which a zener diode 85 and a resistor 86 are connected in series between diode 81E and base of transistor 40E to give a voltage indicative of the oscillation voltage $V_C$ to base of transistor 40E in order to effect the like feedback control as in the above embodiment. Like elements are designated by like numerals with a suffix letter of "E".

Figure 12:
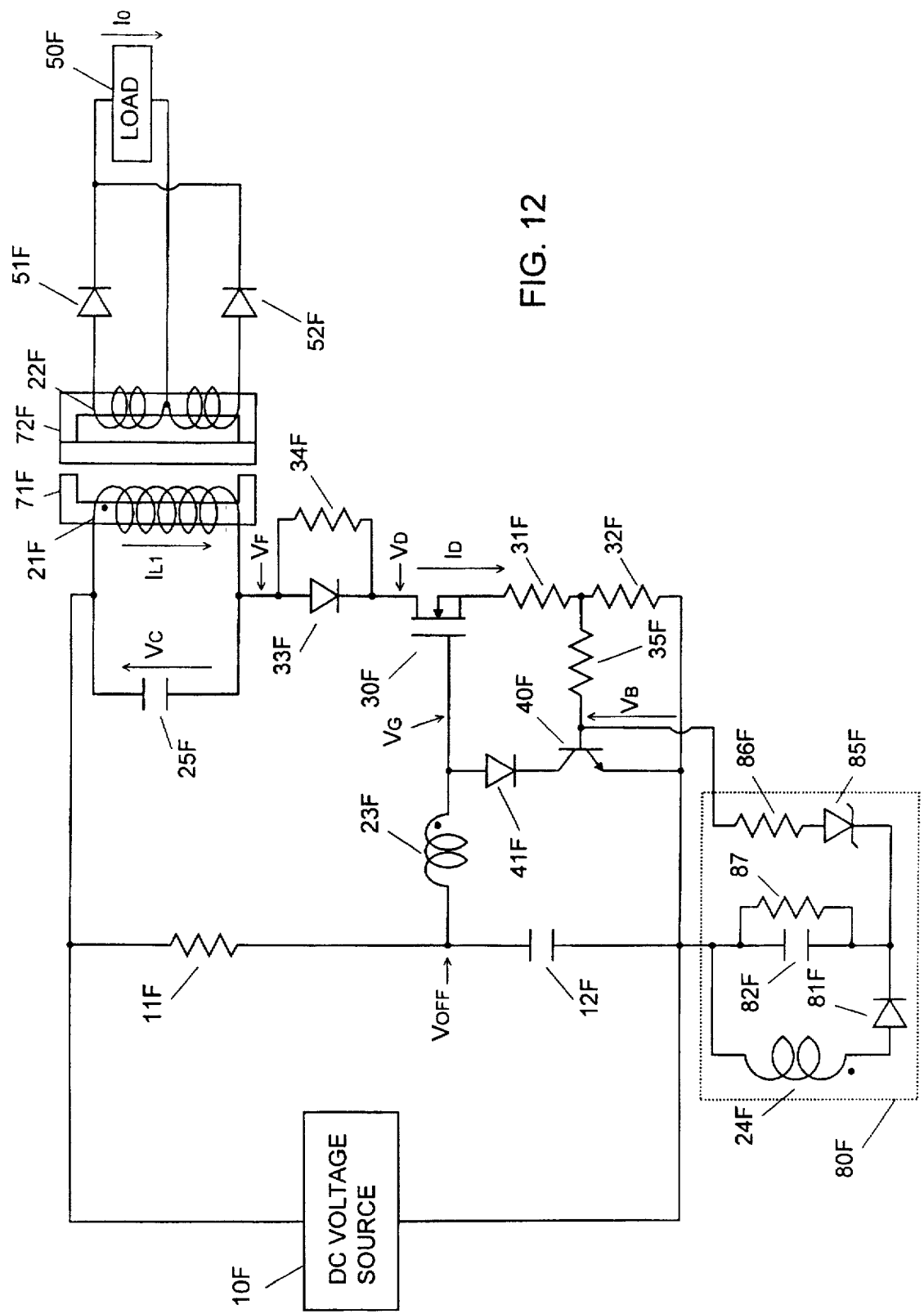

FIG. 12 illustrates another modification of the above circuit in which a resistor 87 is connected across capacitor 82F to rapidly discharge the capacitor 82F for keeping stable oscillation even when the load 50F is connected while the circuit is operating to provide the oscillation voltage $V_C$. Like elements are designated by like numerals with a suffix letter of "F". At the instant when the load is connected while the circuit is operating, the oscillation voltage $V_C$ is caused to lower by the energy delivered to the secondary winding 22F, thereby lowering the feedback voltage $V_X$ given from the auxiliary winding 24F. In the absence of the resistor 87, the feedback voltage $V_X$ would lower gradually, as indicated by dotted lines in FIG. 13, because the capacitor 82F discharges gradually so that the feedback voltage $V_X$ would be kept sufficiently high enough to turn on transistor 40F in the subsequent timing of turning on FET 30F, thereby failing to turn on FET and therefore to supply the current $I_D$ to the resonant circuit. However, by providing of the resistor 87, the capacitor 82F can be rapidly discharged to lower the voltage $V_X$, as shown in solid lines in FIG. 13, until FET 30F is subsequently turned on. Therefore, an adequate voltage $V_X$ can be added to the base of transistor 40F for turning on transistor 40F after FET 30F is turned on, thereby assuring flow of a sufficient amount of the current $I_D$ in order to compensate for the lowering of the oscillation voltage $V_C$, and therefore keeping oscillation stable and providing a constant oscillation voltage $V_C$.

Figure 14:
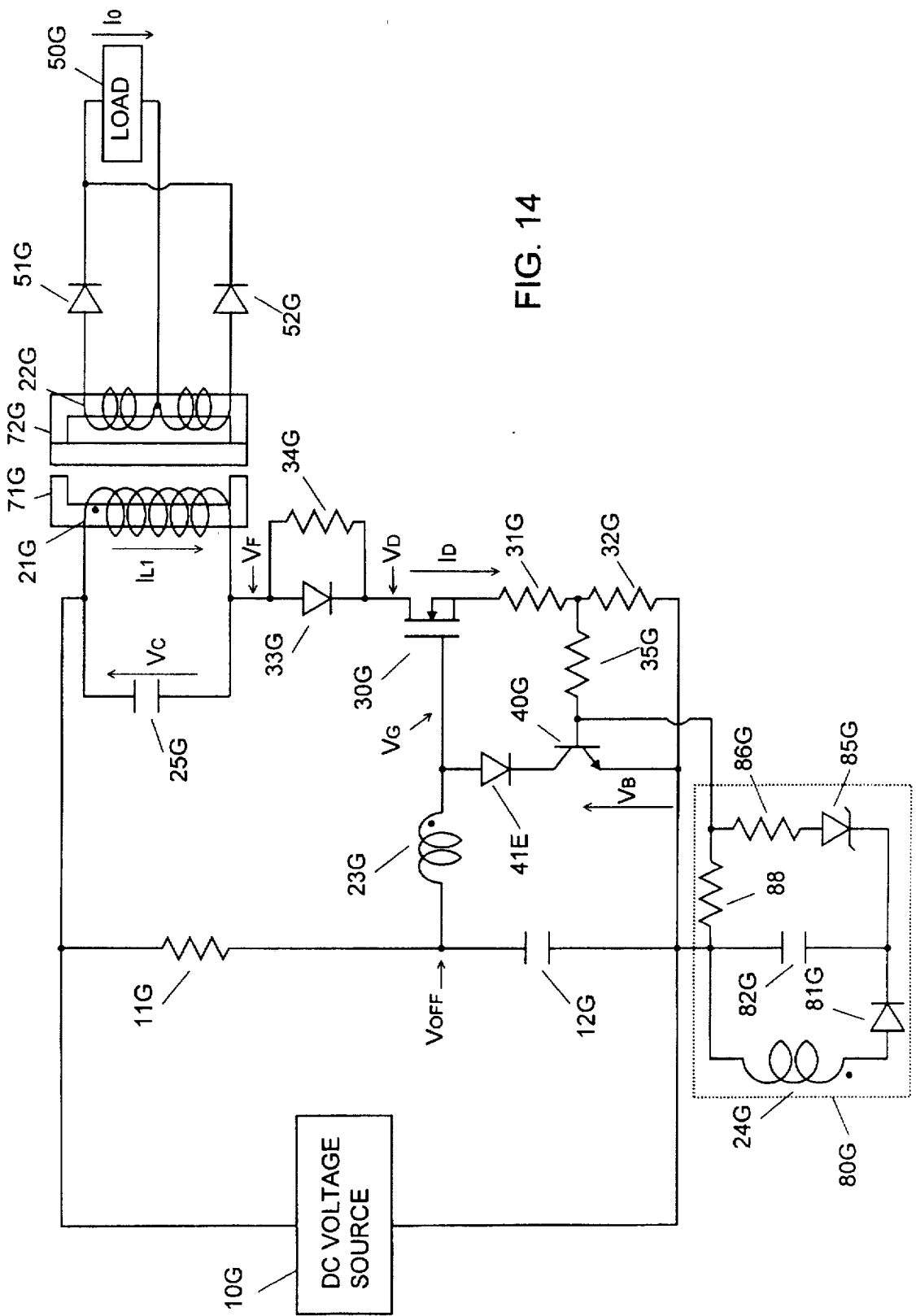
FIGS. 14 and 15 are circuit diagrams illustrating further modifications of the power supply of FIG. 8, respectively.

FIG. 14 illustrates a further modification which is identical to the above circuit of FIG. 11 except that a resistor 88 is connected in series with resistor 85G and zener diode 86G across capacitor 82G. Like elements are designated by like numerals with a suffix letter of "G".

Figure 15:
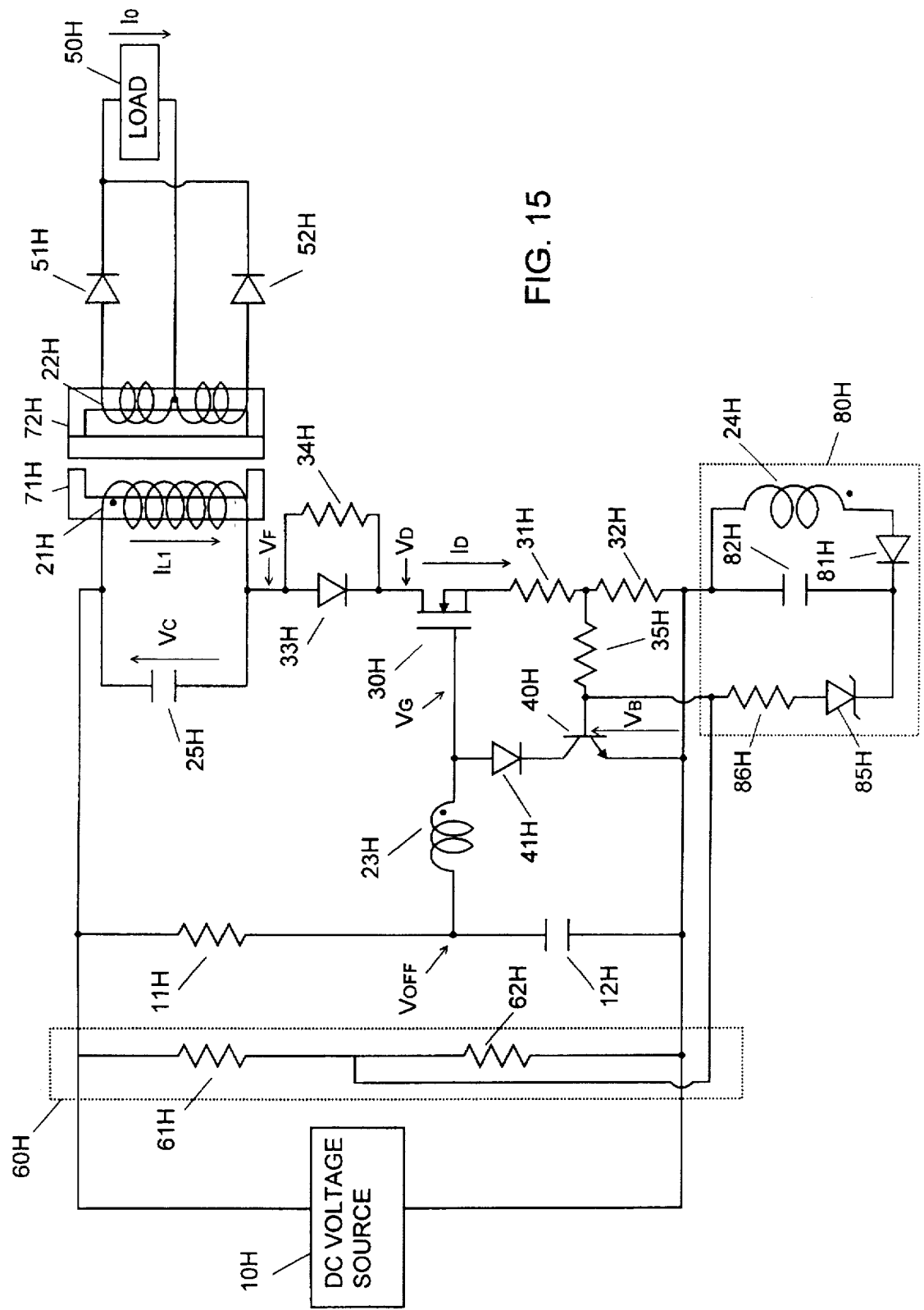

FIG. 15 illustrates a still further modification which is a combination of the circuit of FIG. 4 and the circuit of FIG. 11 for effecting a like feedback control of keeping the oscillation voltage $V_C$ at a constant level by the use of the input voltage monitor 60H and the output voltage monitor 80H. Like elements are designated by like numerals with a suffix letter of "H".

Figure 16:
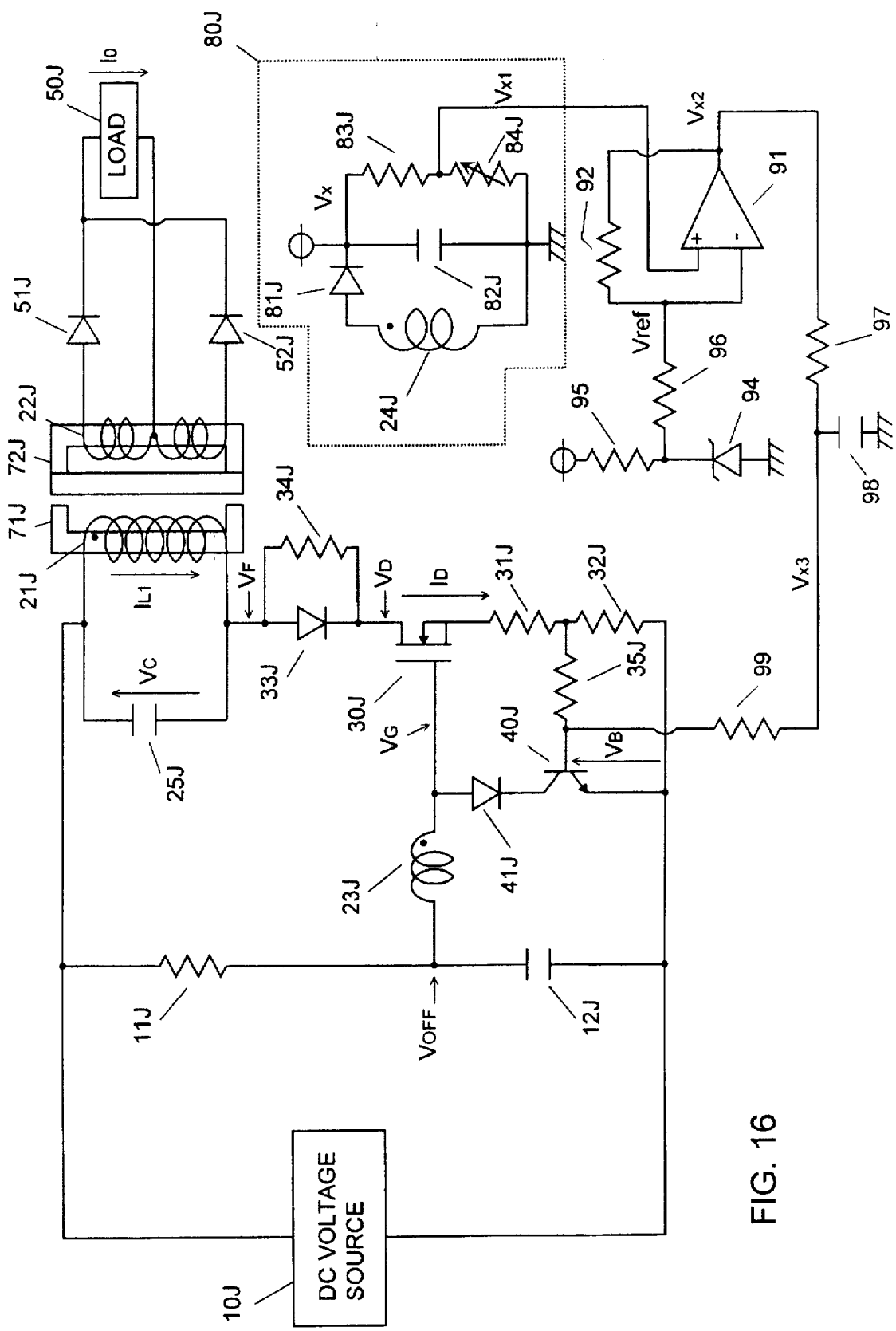
FIG. 16 is a circuit diagram of an inverter power supply in accordance with a fourth embodiment of the present invention.
Figure 17:
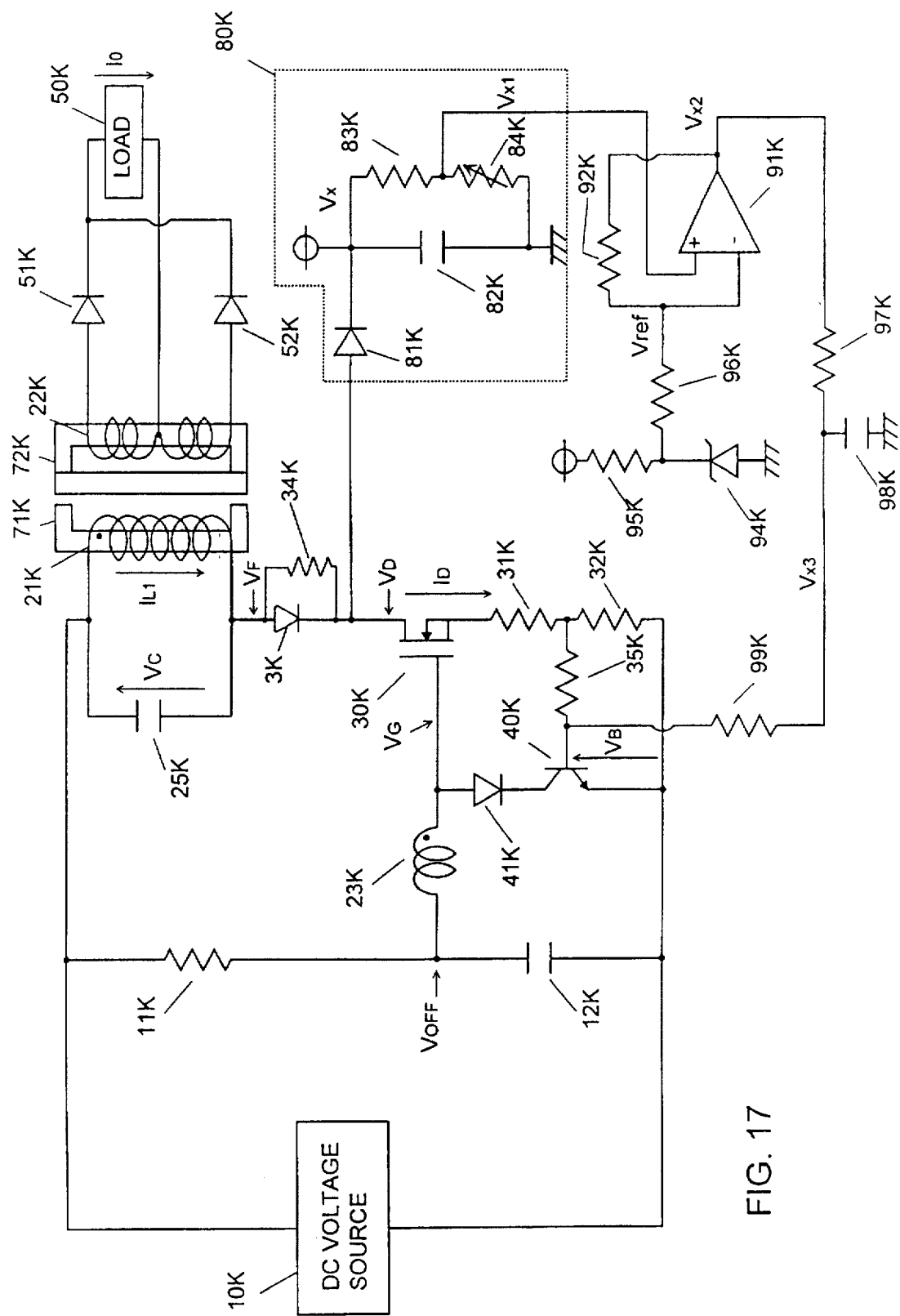
FIG. 17 is a circuit diagram illustrating a modification of the circuit of FIG. 16.

Fourth Embodiment <FIGS. 16 and 17>

FIG. 16 illustrates an inverter power supply in accordance with a fourth embodiment of the present invention which is similar to the third embodiment except that a feedback control is made to provide the oscillation voltage $V_C$ at a constant level equal to n times a reference voltage $V_{ref}$. Like elements are designated by like numerals with a suffix letter of "J". $I_D$ addition to the output voltage monitor 80J composed of a like auxiliary winding 24J, diode 81J, capacitor 82J, and resistors 83J and 84J, the circuit includes an error amplifier composed of an operational amplifier 91 and a resistor 92 connected between an inverting input (−) and an output of the amplifier 91. The output voltage monitor 80J provides a monitored voltage $V_X$ which is divided by resistors 83J and 84J into a voltage $V_{X1}$ being fed to a non-inverting input (+) of the amplifier 91. The reference voltage Vref is generated from a circuit of a zener diode 94 and resistors 95 and 96 and is fed to the inverting input (−) of the amplifier 91 such that the amplifier 91 gives an output voltage $V_{X2}$ which varies in proportion to the difference between voltage $V_{X1}$ and Vref and in a direction of eliminating the difference between the input voltages. The output voltage $V_{x2}$ is integrated through an integrator of a resistor 97 and a capacitor 98 into a corresponding control voltage $V_{x3}$ which is applied as a level signal to base of transistor 40J through a resistor 99.

In operation, when the oscillation voltage $V_C$ increases due to, for example, the lowering load requirement, the output voltage monitor 80J provides increasing voltage $V_x$ and therefore $V_{x1}$ to thereby increase the difference between the voltage $V_{x1}$ and the reference voltage $V_{ref}$, the error amplifier responds to increase the output voltage $V_{x2}$ in order to reduce the difference between the input voltages to the amplifier 91. Thus increased voltage $V_{x2}$ is then integrated to give the gradually increasing control voltage $V_{x3}$ which is applied to the base of transistor 40J, thereby gradually limiting the current $I_D$ and therefore the oscillation voltage $V_C$ to the constant voltage. The above integrator may be eliminated so that the voltage $V_{x2}$ is directly applied to the base of transistor 40J in order to vary the current $I_D$ and therefore the oscillation voltage $V_C$ promptly to the predetermined level.

FIG. 17 illustrates a modification of the fourth embodiment which is similar to the fourth embodiment except that the voltage monitor 80K is connected directly to the drain of FET 30K to provide the voltage $V_x$ proportional to the oscillation voltage $V_C$ without the use of the auxiliary winding. The other configuration and operation is identical to those of the fourth embodiment. Therefore no duplicate explanation is made herein. Like elements are designated by like numerals with a suffix letter of "K".

Figure 18:
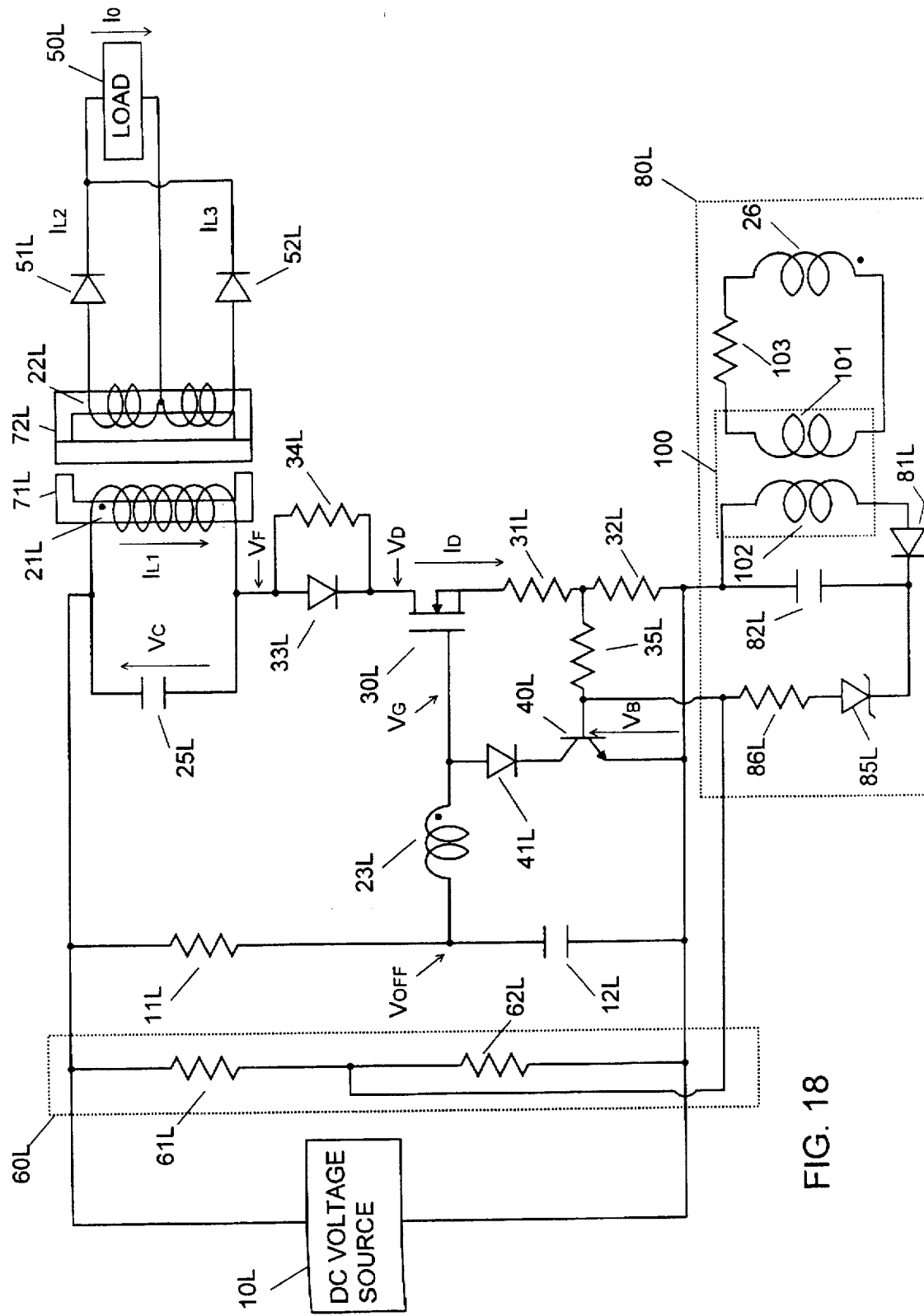
FIG. 18 is a circuit diagram of an inverter power supply in accordance with a fifth embodiment of the present invention.

Fifth Embodiment <FIG. 18>

FIG. 18 illustrates an inverter power supply in accordance with a fifth embodiment of the present invention which is similar to the circuit of FIG. 15 except that the output voltage monitor 80L derives an output voltage from the secondary winding 22L. Like elements are designated by like numerals with a suffix letter of "L". The output voltage monitor 80L comprises an additional winding 26 which is magnetically coupled to the secondary winding 22L to provide a voltage corresponding to the voltage induced at the secondary winding 22L as indicative of currents $I_{L2}$ and $I_{L3}$ flowing into the load 50L. Also included in the output voltage monitor 80L is another transformer 100 which has a primary winding 101 connected in series with a resistor 103 across the additional winding 26 and has a secondary winding 102 across which a diode 81L and a capacitor 82L are connected in series to rectify and smooth the voltage induced at the secondary winding 102. A series circuit of a zener diode 85L and a resistor 86L is connected to provide the voltage from the capacitor 82L to the base of transistor 40L, in an additive relation to a voltage from an input voltage monitor 60L of dividing resistors 61L and 62L connected across the DC voltage source 10L and also in an additive relation to a voltage developed across the current sensing resistor 32L. The primary winding 101 is accommodated within a device housing together with the secondary winding 22L, while the secondary winding 102L is accommodated within a power supply housing together with the primary winding 21L.

In operation, when the currents $I_{L2}$ and $I_{L3}$ increase due to, for example, the lowering load requirement, the additional winding 26 develops a correspondingly increased voltage which in turn increases the voltage induced across the secondary winding 102 of the transformer 100, and therefore the voltage given to the base of transistor 40L, thereby accelerating to turn on transistor 40L and therefore turn off FET 30L. Thus, the current $I_D$ being fed to the resonant circuit is limited to lower the oscillation voltage $V_C$ for maintaining the currents $I_{L2}$ and $I_{L3}$ at a constant level in a feedback manner. When the input DC voltage increases to otherwise increase currents $I_{L2}$ and $I_{L3}$, the correspondingly increased voltage is applied to the base of the transistor 40L so as to rapidly turn on transistor 40L and turn off FET 30L, thereby lowering the oscillation voltage $V_C$ and therefore maintaining the currents $I_{L2}$ and $I_{L3}$ at a constant level.

Figure 19:
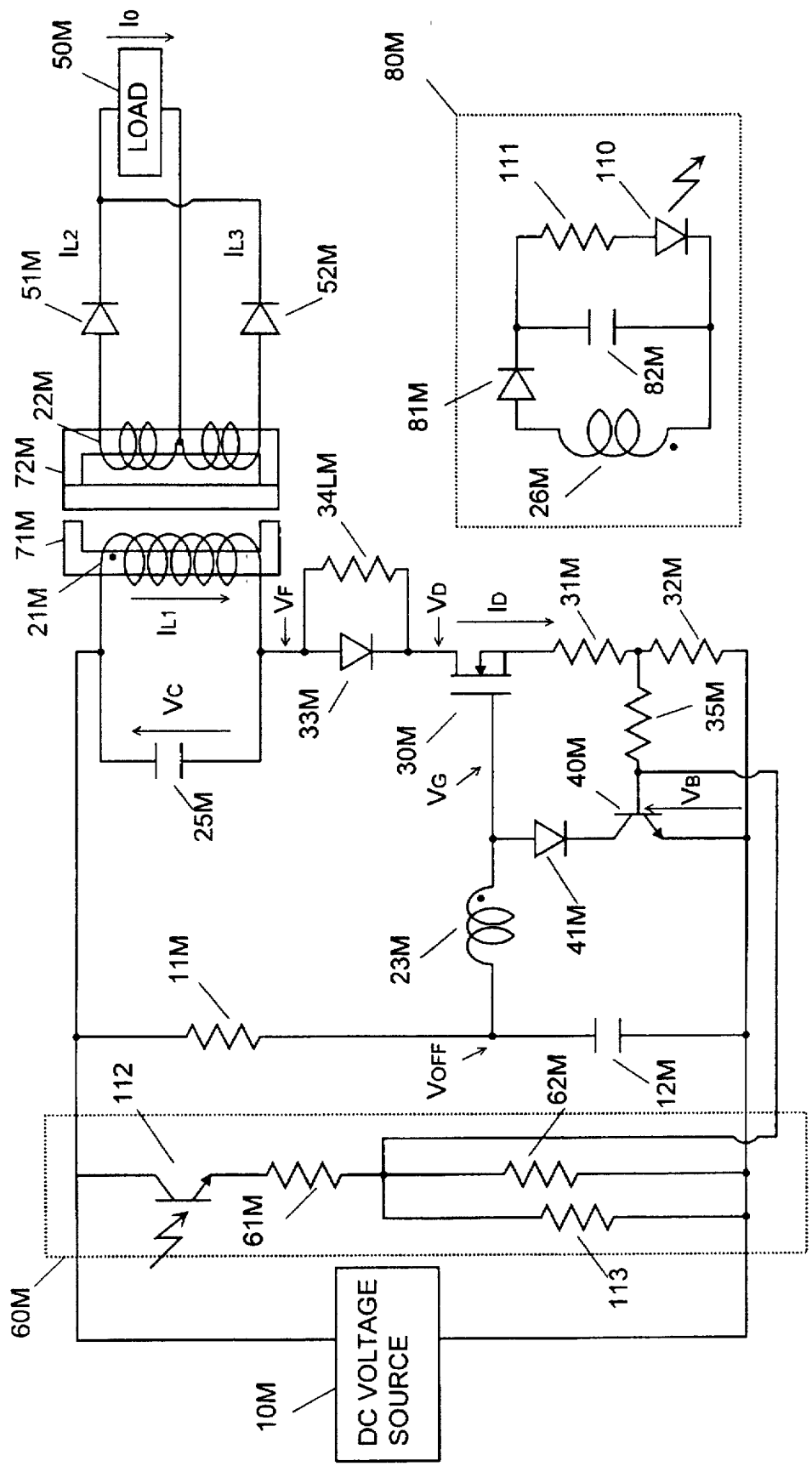
FIG. 19 is a circuit diagram of an inverter power supply in accordance with a sixth embodiment of the present invention.

Sixth Embodiment <FIG. 19>

FIG. 19 illustrates an inverter power supply in accordance with a sixth embodiment of the present invention which is similar to the fifth embodiment of FIG. 18 except for the use of a photo-coupler which transmits an output level signal from the output voltage monitor 80M to an input voltage monitor 60M for varying an input level signal being applied as a feedback voltage to the base of transistor 40M. Like elements are designated by like numerals with a suffix letter of "M". The output voltage monitor 80M comprises an additional winding 26M magnetically coupled to the secondary winding 22M to induce a corresponding voltage which is rectified by a diode 81M and then smoothed by a capacitor 82M. Also included in the output voltage monitor 80M is a light emitting diode 110 connected in series with a resistor 111 across the capacitor 82 to emit a light of which level is proportional to the voltage induced at the winding 26M, i.e., voltage received at the secondary winding 22M. Thus, the light emitting diode 110 gives the output level signal indicative of the currents $I_{L2}$ and $I_{L3}$ flowing to the load 50M. The input voltage monitor 60M includes a photo-transistor 112 inserted in a divider network of resistors 61M, 62M, and 113. The photo-transistor 112 forms the photo-coupler with the light emitting diode 110 and receives the output level signal therefrom to flow the current in the divider network at varying conductivity in proportion to the output level signal. Thus, the input voltage monitor provides the input level signal in the form of a feedback voltage which is indicative of the input DC voltage from the DC Voltage source 10M and also of the output voltage supplied to the load 50M. The input level signal is applied to the base of transistor 40M for controlling to maintain the oscillation voltage $V_C$ at a constant level irrespective of the variations in the input DC voltage and in the load requirement.

For example, when the currents $I_{L2}$ and $I_{L3}$ increase due to the lowering load requirement, the winding 26M induces a correspondingly increased voltage which in turn increases the light from the light emitting diode 110. In this consequence, the photo-transistor 112 responds to flow an increased current to lower the collector-emitter voltage of the photo-transistor 112, thereby increasing the voltage $V_B$ applied to the base of transistor 40M. Thus, transistor 40M will be rapidly turned on so that FET 30M is turned off correspondingly rapidly for limiting the current $I_D$ to lower the otherwise increasing oscillation voltage $V_C$ and the currents $I_{L2}$ and $I_{L3}$, thereby maintaining the constant output to give a constant current I0 fed to the load 5OM.

In the above embodiments and modifications an FET is utilized to interrupt the DC voltage from the DC voltage source in order to supply the current $I_D$ to the resonant circuit, but the present invention is not limited to the use of the FET and may use another switching element such as a bipolar transistor having a control terminal, i.e., base to which a feedback voltage is applied for effecting the above described self-oscillation.

What is claimed is:

1. An inverter power supply for driving an electrical device comprising:
   a DC voltage supply providing a DC voltage;
   a transformer having a primary winding, a secondary winding, and a feedback winding;
   an L-C resonant circuit comprising a capacitor and said primary winding;
   a self-excited oscillator comprising a series connection of said L-C resonant circuit, a parallel arrangement of a resistor and a diode, and a switching element across said DC supply, said switching element being alternately turned on and off to generate a high frequency voltage across said primary winding, a high frequency feedback voltage across said feedback winding and a resulting output AC voltage across said secondary winding, said output AC voltage being applied to a load circuit of said device;
   a biasing capacitor to be charged by a current from said DC voltage, said biasing capacitor being connected in series with said feedback winding to provide an offset voltage which is additive to said high frequency feedback voltage developed across said feedback winding to give a bias voltage applied to a control terminal of said switching element so as to alternately turn on and off said switching element for driving said self-excited oscillator;
   a current sensor which senses a current flowing through said switching element and provides a first level signal indicative of the sensed current;
   a single discharge path extending across said biasing capacitor and not through said switching element;
   switching means consisting of a bipolar transistor inserted in said single discharge path to turn on, upon said first level signal exceeding a threshold level, to discharge said biasing capacitor to a level for maintaining said offset voltage at a constant level during continued oscillation of said L-C resonant circuit.

2. The inverter power supply as set forth in claim 1, including an input voltage monitor which provides a second level signal indicative of said DC voltage supplied from said DC voltage source, said input voltage monitor being connected to add said second level signal to said first level signal such that said switching means is caused to turn on when the sum of said first and second level exceeds said threshold level.

3. The inverter power supply as set forth in claim 1, including an output voltage monitor which provides a third level signal indicative of an output voltage generated across said primary winding, said output voltage monitor being connected in circuit to add said third level signal to said first level signal such that said switching means is caused to turn on when the sum of said first and third level exceeds said threshold level.

4. The inverter power supply as set forth in claim 2, including an output voltage monitor which provides a third level signal indicative of an output voltage generated across said primary winding, said output voltage monitor being connected in circuit to add said third level signal to said first and second level signals such that said switching mean is caused to turn on when the sum of said first, second and third level exceeds said threshold level.

5. The inverter power supply as set forth in claim 3, wherein said output voltage monitor comprises an auxiliary winding magnetically coupled to said primary winding and a rectifier which rectifies an induced voltage developed across said auxiliary winding to provide said third level signal.

6. The inverter power supply as set forth in claim 3, wherein said output voltage monitor comprises an additional winding magnetically coupled to said secondary winding and a rectifier which rectifies an induced voltage developed across said additional winding to provide said third level signal.

7. The inverter power supply as set forth in claim 1, including an output voltage monitor which provides a third level signal indicative of an output voltage generated across said primary winding, and further including an error amplifier having a reference level, said error amplifier connected to receive said third level signal and compare said third level signal with said reference level to provide a fourth level signal which is proportional to the difference between said third level signal and said reference level, said error amplifier being connected to add said fourth level signal to said first level signal such that said switching means is caused to turn on when the sum of said first and fourth level exceeds said threshold level.

8. The inverter power supply as set forth in claim 7, further including an integrator which is connected between said error amplifier and said switching means to integrate the fourth level signal to be added to said first level signal.

9. The inverter power supply as set forth in claim 1, including an input voltage monitor which comprises a voltage divider of resistors connected across said DC voltage source to give a divided voltage thereof, said input voltage monitor including a photo-transistor which is connected in series with said resistors to vary a current flowing through said resistors in accordance with intensity of light received at said photo-transistor; and further including an output voltage monitor which gives a monitored voltage indicative of the voltage developed at said primary winding, said output voltage monitor comprising a light emitting diode which emits a light of which intensity is proportional to said monitored voltage and which is photo-coupled to said photo-transistor, said input voltage monitor being connected in circuit to turn on said switching means when said divided voltage exceeds said threshold level.

10. The inverter power supply as set forth in claim 1, wherein said switching element is an FET transistor and said bipolar transistor is inserted in a source-gate path of said FET, said current sensor being defined by a resistor inserted in a base-emitter path of said bipolar transistor.

* * * * *